(12) United States Patent
Ishida et al.

(10) Patent No.: US 7,555,007 B2
(45) Date of Patent: Jun. 30, 2009

(54) INTEGRATED MANAGEMENT SYSTEM AND METHOD FOR NETWORK CONNECTION MEANS IN NETWORKS HAVING DIFFERENT TELECOMMUNICATION PROTOCOLS

(75) Inventors: Kiyoshi Ishida, Chiyoda-ku (JP); Masanobu Saitoh, Chiyoda-ku (JP); Kenichiro Hayashi, Chiyoda-ku (JP)

(73) Assignee: Internet Initiative Japan, Inc., Tokyo (JP)

( * ) Notice: Subject to any disclaimer, the term of this patent is extended or adjusted under 35 U.S.C. 154(b) by 627 days.

(21) Appl. No.: 11/266,260

(22) Filed: Nov. 4, 2005

(65) Prior Publication Data

US 2006/0109797 A1    May 25, 2006

(30) Foreign Application Priority Data

Nov. 5, 2004    (JP) .............................. 2004-322198

(51) Int. Cl.
*H04J 3/22* (2006.01)
*H04L 12/28* (2006.01)
(52) U.S. Cl. ....................................... 370/466; 370/401
(58) Field of Classification Search ................. 370/230, 370/235, 236, 398, 392, 395.2, 395.21, 395.5, 370/395.54, 400, 401, 465, 466; 709/220–228
See application file for complete search history.

(56) References Cited

U.S. PATENT DOCUMENTS

2005/0175020 A1* 8/2005 Park et al. .................... 370/400
2006/0187854 A1* 8/2006 Booth et al. ................. 370/254
2007/0183363 A1* 8/2007 Liden .......................... 370/331

FOREIGN PATENT DOCUMENTS

| JP | 2000-357140 | 12/2000 |
| JP | 2003-348173 | 12/2003 |
| JP | 2006-193988 | 7/2004 |

OTHER PUBLICATIONS

T. Narten et al.; "Neighborhood Discovery for IP Version 6 (Ipv6)"; Network Working Group, Request for Comments:2461, Obsoletes:1970, Category:Standards Track (1998); http://www.ietf.org/rfc/rfc261.txt?number=2461; Oct. 4, 2005.

* cited by examiner

*Primary Examiner*—Aung S Moe
*Assistant Examiner*—Feben Haile
(74) *Attorney, Agent, or Firm*—Fish & Richardson P.C.

(57) ABSTRACT

In accordance with the present invention, a plurality of routers in more than one network based on different protocols can be integrally managed. The management system of the present invention is capable of integrally managing a plurality of routers in a network based on IPv6 from another network based on IPv4, wherein a relay server receives the identification data from a router, and transmits it to a LAN server. The LAN server uses the received identification data, and pushes the configuration data prepared in advance for the accessing router into the router. The relay server, which has a converting function between IPv4 and IPv6, manages the network on the routers side by IPv6 while it manages the network on the LAN server's side by IPv4.

23 Claims, 8 Drawing Sheets

-- Prior Art --

MAC Address (hexadecimal representation)
UU:VV:WW:XX:YY:ZZ
(Example) 0e:14:a3

IPv6 Link Local Address (hexadecimal representation)
|fe80|0000|0000|0000|**VV|WWff|feXX|YYZZ|
(Example)|fe0e|14a3| mapped onto 10.0.0.0/8 space of IPv4 addresses.

|0A|XX|YY|ZZ|
(Example)|0e|14|a3| = |10|14|20|163 (decimal representation)

10.14.20.163/8

Conversion

INTEGRATED MANAGEMENT SYSTEM AND METHOD FOR NETWORK CONNECTION MEANS IN NETWORKS HAVING DIFFERENT TELECOMMUNICATION PROTOCOLS

BACKGROUND OF THE INVENTION

The present invention generally relates to a telecommunication network management system, and more particularly to a telecommunication network management system by which the configuration of each of a plurality of routers included in a network can collectively be set up, modified, and monitored.

A router is a widely used device that interconnects networks, and forwards data packets between networks by its routing operation. If, for example, a router is used to connect a local area network (LAN) with the Internet, it is necessary that it should be configured to connect both an Ethernet® cable from the LAN side and a telephone or dedicated line on the Internet side to the respective connectors of the router, and to provide a power supply to the router. In other words, a router needs to have an initial configuration set up in accordance with how it is connected, to have its initial configuration updated as required, and to manage its operation by continuously monitoring the operational conditions. To achieve such an end, each router has to be separately maintained by taking its specific situation into consideration, which is expensive and time-consuming. Usually, an engineer with telecommunications expertise logs in a router by using Telnet protocol, for example, and transmits configuration files to the router, thereby setting up its configuration. If such a conventional set up procedure is employed, it is necessary for a skilled engineer to work separately on every router to be set up.

This application is related to a co-pending Japanese Patent Application No. 2002-359720 entitled "Integrated Management System and Method for Network Connection Means", filed on Dec. 11, 2002, which has been assigned to the same assignee of the present application, and which was published as Japanese Patent Publication No. 2004-193988 on Jul. 8, 2004. The entire disclosure of this previous application is incorporated in this application. In this previous application, an invention (to be referred to as the previous invention) was proposed to overcome the problems associated with the prior art discussed in the paragraph above. In the present invention, we would like to propose a system and method, wherein the integrated management system and method similar to the previous ones have been modified so as to be applied to networks having both IPv4 and IPv6 as their telecommunication protocols.

First, the integrated management system disclosed in the previous application will be briefly reviewed with reference to FIG. 1, which corresponds to FIG. 2 of the previous application. FIG. 1 illustrates basic elements of the integrated management system of routers 100. Each of a plurality of routers 105, which are to be collectively managed by system 100, connects a LAN with an external network 106 such as the Internet, and performs routing operations of data packets between the LAN and network 106. In this example, a LAN may be a local network connecting a number of terminals that exist in a corporation or a public organization.

In system 100, two network servers, initial server 102 and user server 104, which function differently from each other, are provided. In such a configuration, it is supposed, in this example, that a new router 105 is to be used as a device that connects a LAN and network 106. In the storage (not shown) of router 105, when the router is just out of a factory, the data necessary to connect to initial server 102 is stored except for such security-related data as to encryption and cross-authentication. Also, an identifier such as a serial number is assigned to each of routers 105 so that each router may be identified uniquely. Data related to the identifiers of all the routers that are to be used in system 100 are stored in initial database 101, which is connected in initial server 102. Encryption such as SSL and SSH, and cross-authentication using digital signatures and other appropriate means are achieved in such a configuration.

Router 105, which is about to be used, is configured to automatically access initial server 102 when cables are connected to its connectors and power is supplied to it. Initial server 102, when it receives an access from router 105, first confirms that it is an illegal access, and recognizes the router through its identifier. Initial server 102 then obtains from initial database 101 the connection data, such as a Uniform Resource Locator (URL), to a user server 104 that is responsible for management of the accessing router, and sends the data to router 105. Initial server 102 functions as an operational guidance means for router 105 accessing it.

Router 105, when it receives from initial server 102 connection data to a corresponding user server 104, accesses the user server. The user server, responsive to an access from router 105, recognizes the accessing router 105 through its identifier, obtains from user database 103 configuration data necessary for the accessing router 105 to operate as a router, and transmits the data to router 105. Router 105, when it receives the configuration data from user server 103, has its initial configuration set up using the received data, and begins to operate.

As is briefly discussed above, the integrated management system of routers proposed in the previous application overcomes the problems encountered in the prior art systems that each router has be configured separately, and it becomes possible to manage a number of routers much more easily and efficiently. Further, routers, regardless of which telecommunication lines are connected to them, may be operated under the system. Also, in this integrated management system of routers proposed in the previous application, it is possible to automatically collectively provide an initial configuration of all the routers, update firmware and change configuration, and manage the operation by monitoring them regardless of whether the routers are connected to the Internet or to WANS.

In the example discussed above, it is assumed that the routers are employed to connect and perform routing operations among LANs within a corporation the branches of which are situated in a geometrically distributed manner, the Internet, and WANs. However, the invention disclosed in the previous application is not limited to routing devices with regard to what is managed by the integrated management system in accordance with the present invention. The system is capable of integrally managing such hardware, firmware, software, or any combination of these that are connected to one or more networks, as long as the configurations of these devices may be changed. For example, besides routers, the previous system is capable of managing WINDOWS® or Macintosh® personal computers and UNIX® workstations because these devices can be regarded as being network-connected terminals the configurations of which need to be set up.

In the previous application, it was not specifically mentioned whether the protocol of each of the networks connected by the routers is based on is IPv4 or IPv6. In this application, however, we would like to propose a new system and a method by which it is possible to integrally manage network connection means such as routers in networks wherein more than one protocol is used.

SUMMARY OF THE INVENTION

In accordance with an embodiment of the present invention, a system for integrally controlling a plurality of network means is provided. The system comprises: a first management means for connecting a first network wherein a first protocol is used and a second network wherein a second protocol, which is the same as or is different from the first protocol, is used; and a second management means connected to the first management means on the second network's side, wherein the plurality of network connection means are connected to the first management means on the first network's side, wherein (a) each of the plurality of network connection means comprises: storage means for storing the identification data of the network connection means; means for transmitting a data packet to find the first management means; means for receiving the identification data of the first management means transmitted, responsive to the data packet, from the first management means; means for converting the received identification data of the first management means to the connection data to the first management means; and means for transmitting the identification data of the network connection means stored in the storage means to the first management means using the connection data to the first management means obtained by the converting means; (b) the first management means comprises: means for receiving the identification data from each of the plurality of network connection means; means for transmitting the received identification data to the second management means; means for transmitting the configuration data of the network connection means transmitted, responsive to the transmitted identification data, from the second management means to the network connection means; and address conversion means for converting addresses between the first and second protocols when the first and second protocols are different, and for not converting addresses between the first and second protocols when the first and second protocols are the same; (c) the second management means comprises: storage means for storing configuration data prepared for the plurality of network connection means; means for receiving from the first management means the identification data transmitted from each of the plurality of network connection means; and means for obtaining the configuration data of the network connection means identified using the received identification data from the storage means, and transmitting the obtained configuration data to the first management means, thereby realizing the integral management of the plurality of network connection means.

In accordance with another embodiment of the present invention, the second protocol is the Internet Protocol including IPv4 and IPv6, and the first protocol is the Internet Protocol including IPv4 and IPv6 or other protocols used in local area networks (LANs).

In accordance with still another embodiment of the present invention, difference data between new configuration data to update the configuration data of each of the plurality of network connection means and the current configuration data of each of the plurality of network connection means, and schedule data to deliver the difference data are stored in the storage of the second management means; and the second management means further comprises means for transmitting the difference data to each of the plurality of network connection means via the first management means in accordance with the schedule data.

In accordance with still another embodiment of the present invention, the first management means further comprises: proxy monitoring means for monitoring the state of the operation of each of the plurality of network connection means and means for notifying a management server connected to the second network of any anomaly found in any of the plurality of network connection means by the monitoring means.

In accordance with still another embodiment of the present invention, the second management means further comprises a single user interface through which the configuration data of each of the plurality of network connection means stored in the storage means can be inputted.

The present invention can also be understood as a method for controlling the above-mentioned management system. In addition, the present invention can also be understood as a computer-readable storage medium in which a computer program that instructs a computer to execute the steps included in such a method is stored, or as such a computer program itself.

BRIEF DESCRIPTION OF THE DRAWINGS

The present invention will later be described by referring to the drawings, in which.

DETAILED DESCRIPTION OF THE INVENTION

Figure 1:
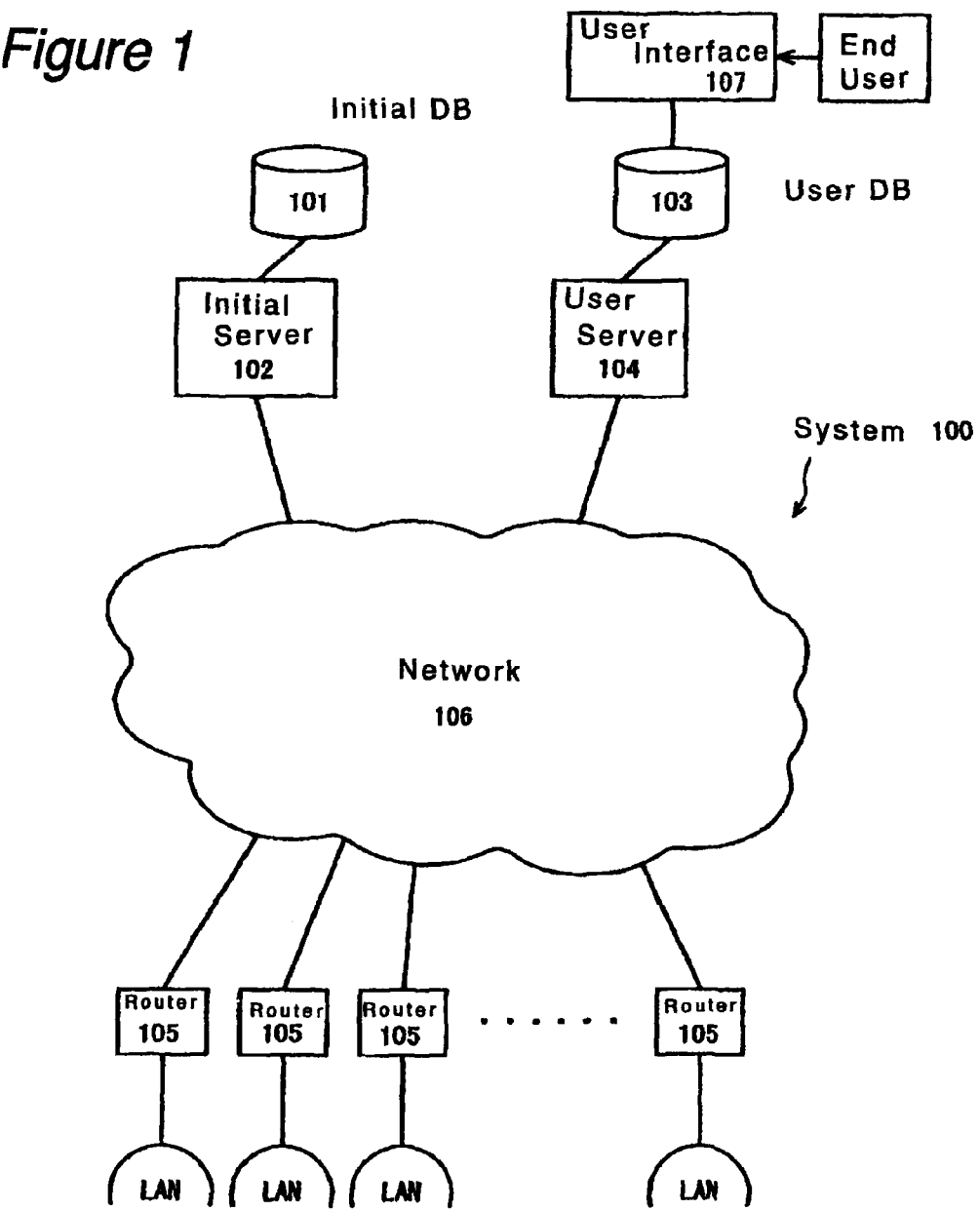
FIG. 1 shows a block diagram of a prior art integral management system of routers disclosed in the present application.
Figure 2:
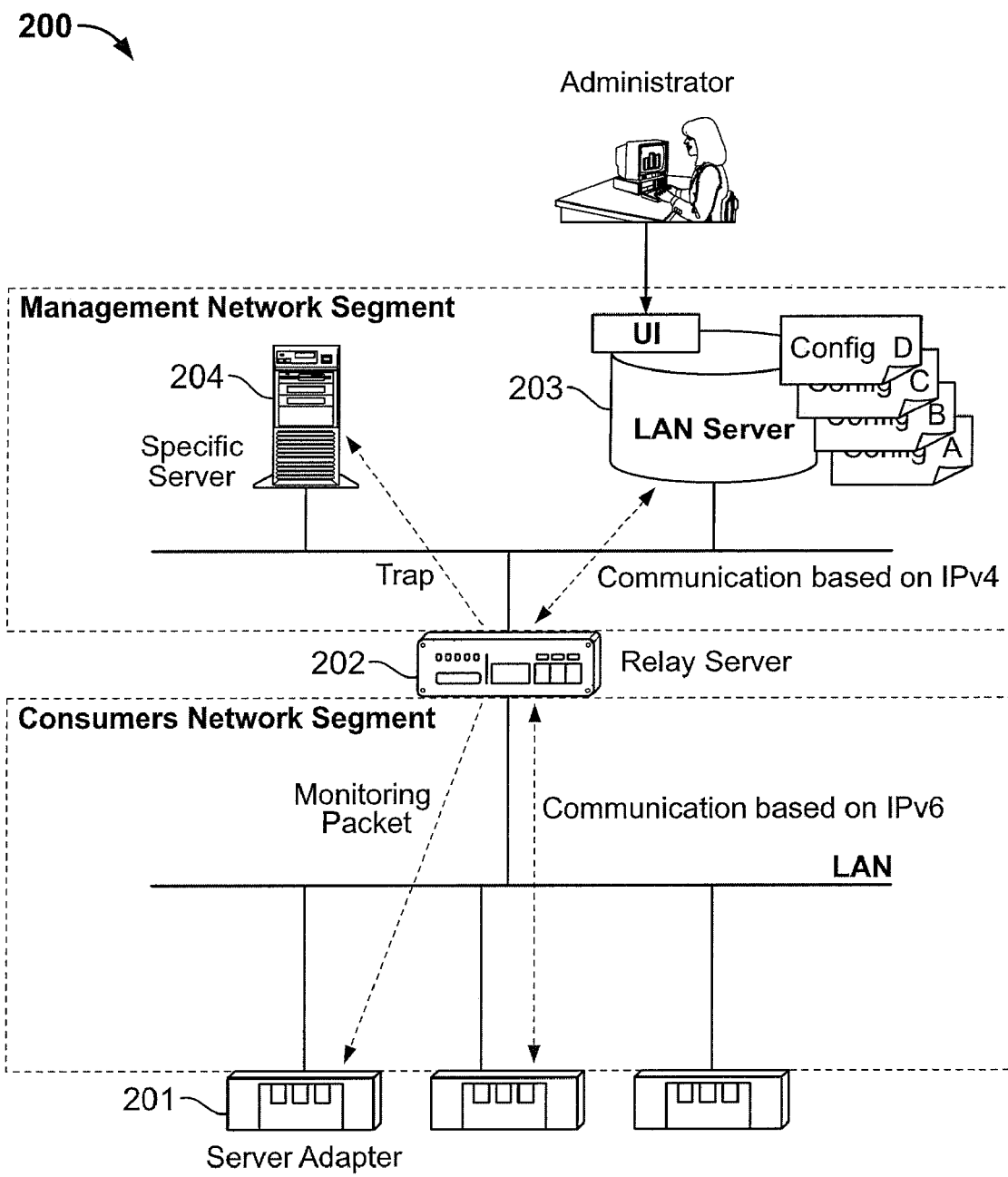
FIG. 2 shows a block diagram of an integral management system of network connection means in accordance with the present invention.

An embodiment of the present invention will be explained by referring to the attached drawings. FIG. 2 illustrates an integrated management system of network connection system 200 in accordance with the present invention (hereinafter also referred to as "management system 200"), wherein the management system comprises three components, which are service adapters, a relay server, and a LAN server. Service adapter 201, which is the first component, may be a router that operates on the basis of a configuration that is automatically set up by management system 200 or that is updated by difference data. Access to service adapter 201 is limited only to LAN server 203. Also, the configuration data will not be stored in service adapter 201. Service adapter 201, when power is supplied and is connected to a LAN, will automatically obtain the connection data necessary to access relay server 202. Then, service adapter 201 will obtain the data necessary to enable it to operate as a router from LAN server 203 via relay server 202, so that it will automatically have its configuration completed.

The second component is relay server 202. Relay server 202 establishes communication with service adapter 201, relays autonomous communication from service adapter 201 to LAN server 203, and functions to deliver information on LAN server 203 to service adapter 201. In addition, relay server 202 constantly monitors the operational status of each of service adapters 201, and if it finds an anomaly in any of service adapters 201, notifies a specific server 204 of a trap telling such anomaly. In this embodiment, communication between relay server 202 and service adapter 201 is based on the IPv6 protocol, while communication between relay server 202 and LAN server 203 is based on IPv4. Therefore, relay server 202, situated between networks each based on a different protocol, converts the protocols between IPv4 and IPv6. Though there may be a plurality of conversion methods, in this embodiment, a network of 10/8 is employed in the IPv4 network, and three least significant octets of the MAC address are mapped onto the three least significant octets. At relay server 202, for each of service adapters 201, the connection data to LAN server in which such data as the configuration data of the service adapter is stored, and to a specific server 204 that is responsible for monitoring the service server as a proxy are stored. When it receives a communication from any of service adapters 201 using these connection data, relay server 202 relays the communication to an appropriate LAN server 203 or an appropriate specific server 204. More than one relay server 203 may be employed in a redundant manner.

The third component is LAN server 203. LAN server 203 stores such identification data as the serial number and the MAC address of each service adapter, and maintains its configuration data (configuration files) and configuration history. LAN server 203 also maintains the schedule data on the basis of which the configuration data will be transmitted into each service adapter at a constant time interval. Configuration procedure by a system administrator is performed through a user interface provided by LAN server 203. If more than one relay server 202 is employed in a redundant manner, both its grouping data and the redundant data of LAN server itself will be maintained.

Next, communication within management system 200 will be described. Service adapter 201, which may be a router in this embodiment, is identified by using the MAC address that is uniquely assigned to each of the devices included in a LAN, and the link local address that is generated by the IPv6 based device based on its MAC address as the identification address and management address, respectively. Thus, communications in the lower half of FIG. 2, that is, in the customer network segment below relay server 202, are achieved by using link local addresses of IPv6. This is why communications based on the conventional IPv4 protocol are not interfered with. On the other hand, communications between the upper half of FIG. 2, that is, the management network segment, and the customer network segment of the lower half are based on IPv4 in the upper half and are based on IPv6 in the lower half. Relay server 202 performs conversion between the protocol and application levels as well as between the IPv4 address and the link local address of IPv6.

Figure 3:
FIG. 3 shows an outline of the address conversion mechanism in the relay server.

As is briefly mentioned above, relay server 202 functions to convert addresses between the different protocols; in this embodiment, between IPv4 and IPv6. An exemplary method of converting addresses is shown in FIG. 3, which we will discuss now. A MAC address, which is uniquely assigned to every device included in a LAN such as an Ethernet® card, can be used as a link local address of IPv6 as discussed already. Now, let a MAC address be written as UU:VV:WW:XX:YY:ZZ using the hexadecimal notation, and let its digits equal to or less than XX be 0e:14:a3. Then, if we use such a MAC address and suppose that the link local address of IPv6 written as the hexadecimal notation is |fe80|0000|0000|0000|VV|WWff|feXX|YYZZ, then, we will be able to generate a link local address, the digits equal to or less than fe of which are |fe0e|14a3|. We now consider a map that maps the link local address of IPv6 to an address of IPv4 such as |0A|XX|YY|ZZ|. If we suppose that the digits equal to or less than XX are |0e|14|a3|, they can be written as |10|14|20|163| in the decimal notation. Therefore, the above map gives a mapping from the previously generated link local address to 10.20.163/8. If the above-outlined process is used, we can obtain a one-to-one correspondence between a MAC address in a LAN and an IPv4 address, which can be readily implemented as a conversion function of relay server 202**. This is of course a single example, and many other conversion rules can be employed.

Figure 4:
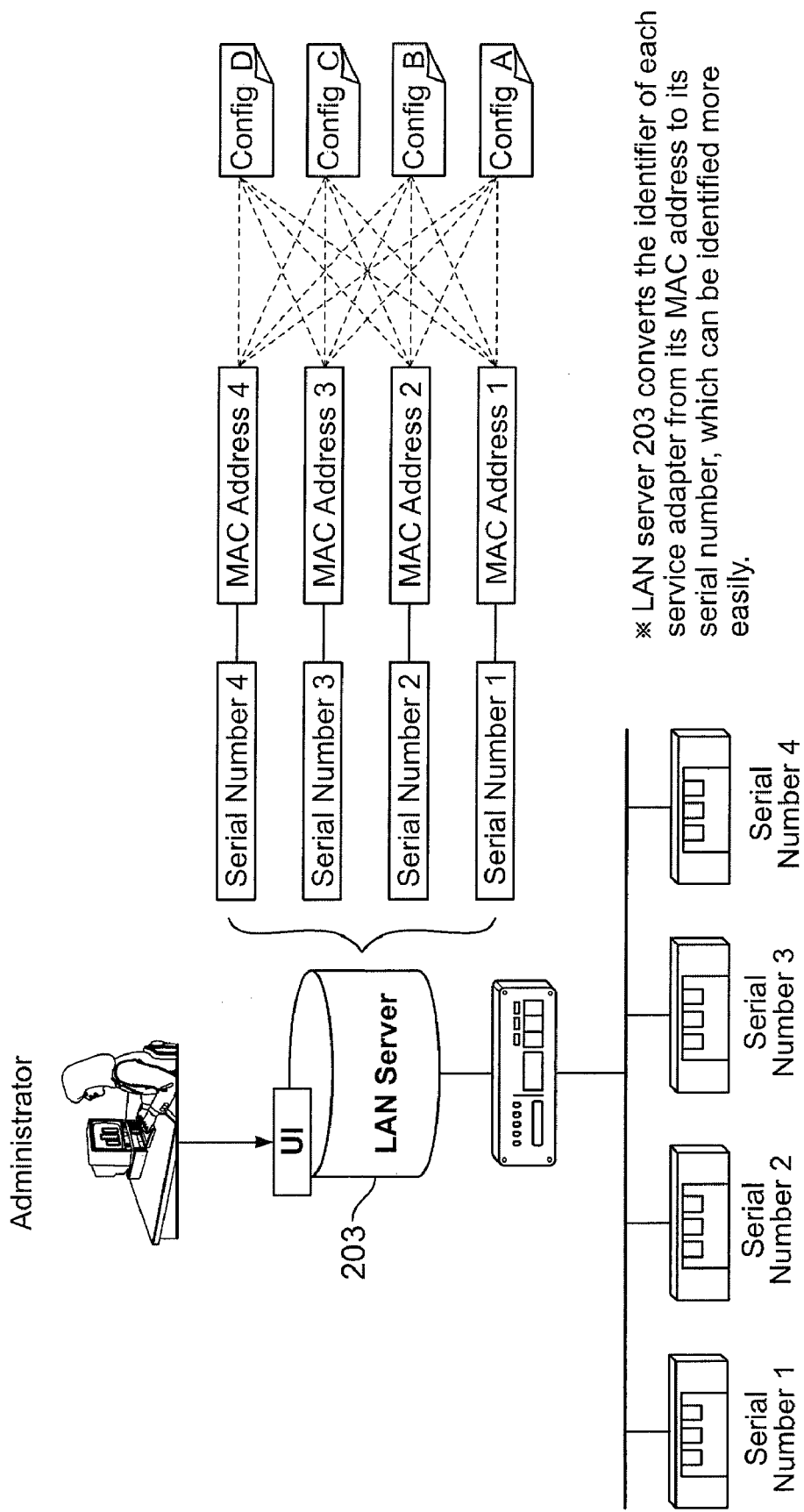
FIG. 4 shows an outline of how configuration data are generated and stored.

Referring now to FIG. 4, how a configuration is generated and stored will be described. Configuration of each of service adapters 201 is integrally made at LAN server 203. Please note that such configuration is made in advance. More specifically, a system administrator accesses the user interface (UI) prepared at LAN server 203, and generates a configuration of each of service adapters 201 so that the service adapter 201 will be operated. At this stage, the service adapter 201 does not need to be connected to a LAN. When the service adapter 201 is later physically connected to a LAN, the configuration files prepared in advance will be automatically mapped to the service adapter 201 that is to be configured, thereby completing its configuration. The configuration files generated for each service adapter 201 will be managed and maintained by LAN server 203.

We have discussed the components included in management system 200 and communications among these components. We will now discuss how the initial configuration of service adapter 201 is automatically made, how the initial configuration is updated by providing it with difference data, and how service adapter 201 is monitored by relay server 202, which are the three main operations of management system 200 in accordance with the present invention.

Figure 5:
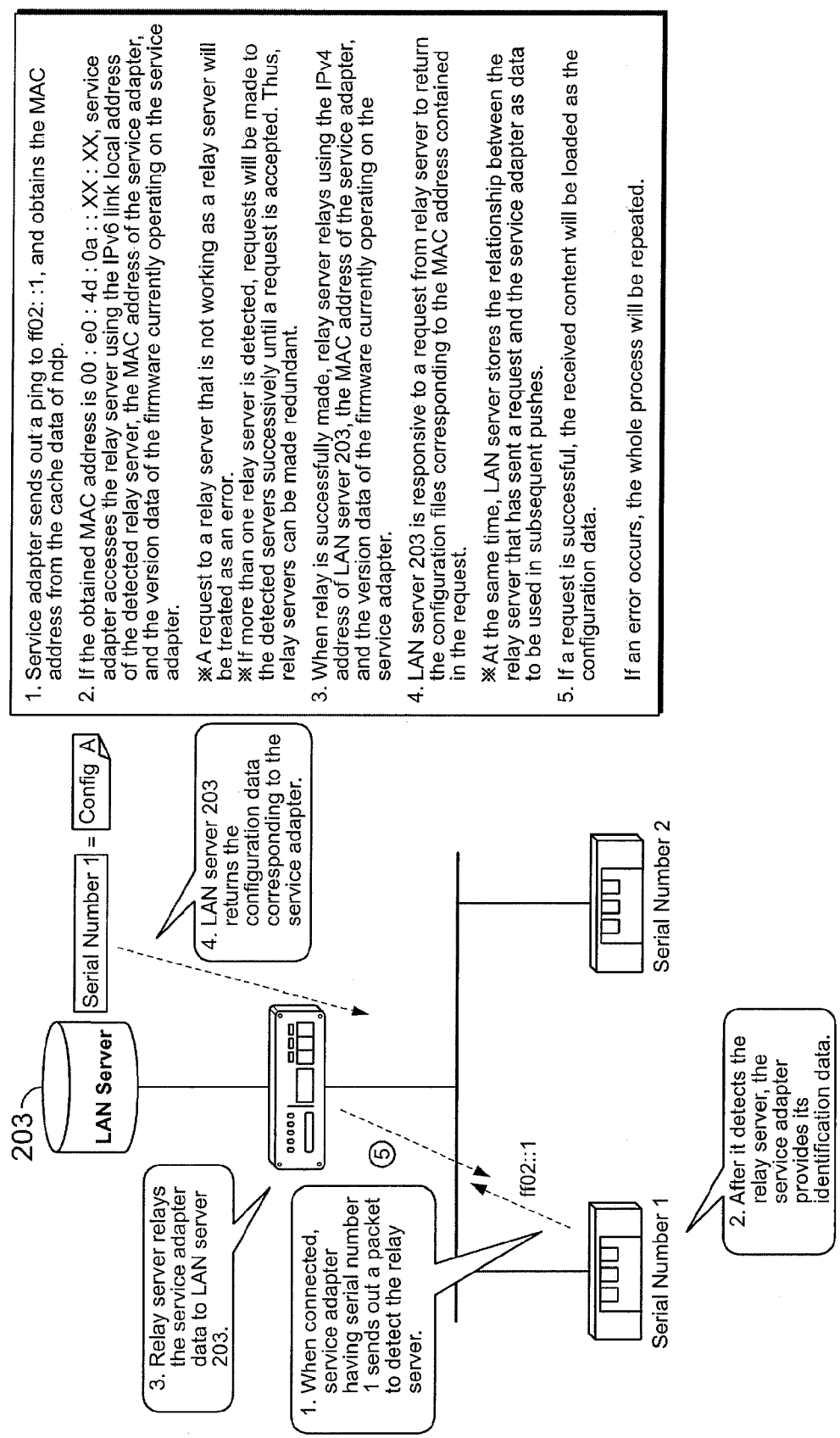
FIG. 5 shows how the initial configuration of a service adapter can automatically be made.

First, the initial configuration of service adapter 201 is automatically completed as an autonomous operation of the service adapter as illustrated and described in FIG. 5. Service adapter 201 transmits a detection data packet to find relay server 202 when connected to a LAN, by connecting cables and supplying power to it. When relay server 202 is found by this detection data packet, service adapter 201 accesses the detected relay server 202 by using the IPv6 link local address of the relay server 202, and notifies it of its own MAC address as its identification data and the version of the firmware that it is currently operating. Relay server 202 relays the data received from service adapter 201 to LAN server 203. LAN server 203 uses the relayed identification data (MAC address) from service adapter 201 to identify which service adapter is accessing, and returns the configuration files prepared in advance specific to that service adapter 201. Service adapter 201 receives the configuration files, and is automatically configured by the received configuration files. LAN server 203 holds the corresponding relation between service adapter 201 and relay server 203, which have been obtained from the series of communications above, so that it will be able to use it in future push procedures.

Figure 6:
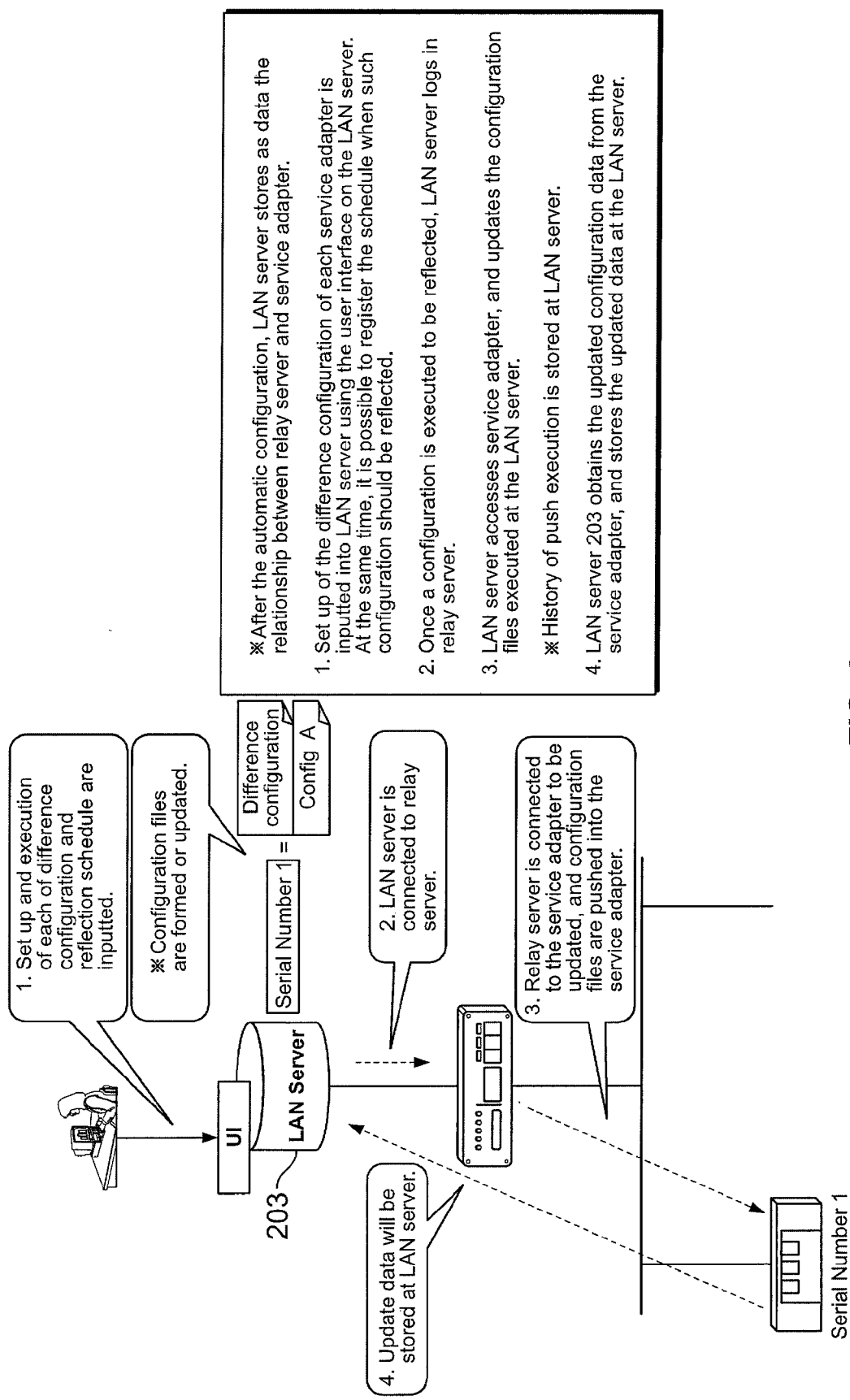
FIG. 6 shows how a service adapter can be updated by difference data.

Secondly, an outline of difference configuration of service adapter is illustrated in FIG. 6. By using this difference configuration, such a configuration process is performed wherein service adapter 201 that has been already initially configured and has been operating is updated by LAN server 203, which provides service adapter 201 with the difference data between the initial configuration files and the second configuration files after the firmware is changed. The system administrator sets up, using the above-mentioned user interface at LAN server 203, the difference configuration files and determines when the update is to be carried out. At the determined update time, LAN server 203 logs in relay server 202, further accesses, via relay server 202, service adapter 201 to be updated using the difference configuration, and pushes the difference configuration files into it. If the difference configuration is successfully pushed into service adapter 201, LAN server 203 obtains the updated configuration data from service adapter 201, and maintains the updated data at LAN server 203 in an integrated manner.

Figure 7:
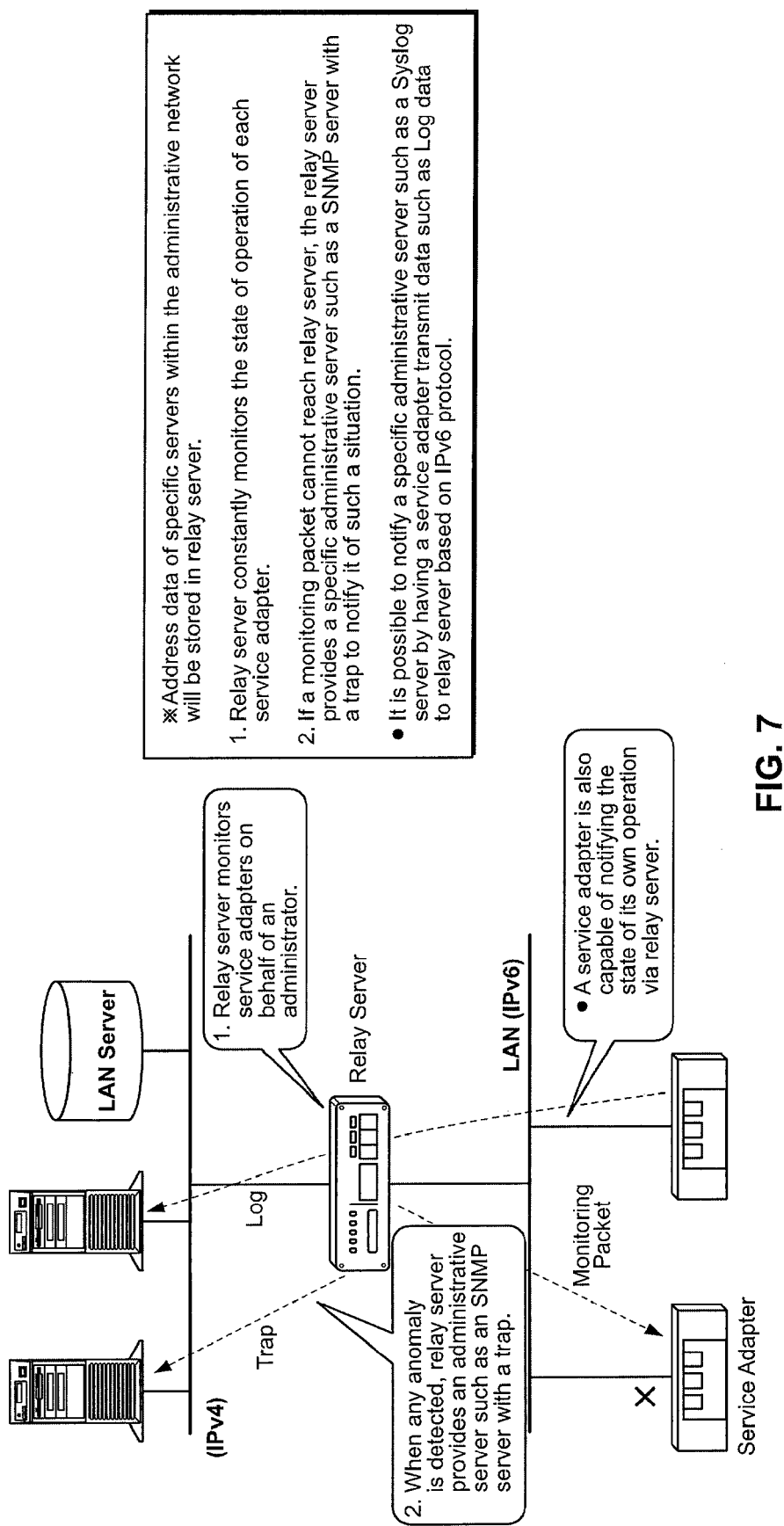
FIG. 7 shows how a service adapter can be monitored by the relay server.

Thirdly, the monitoring of service adapter 201 by relay server 202 is outlined in FIG. 7. Relay server 202 constantly monitors the state of operation of each service adapter 201. When it finds an anomaly, relay server 202 sends a trap to a conventional management server such as an SNMP so as to be a proxy monitoring system of service adapters 201. This is because the conventional management server cannot manage service adapters 201 if it is based on IPv4.

As is outlined above, by using management system 200 in accordance with the present invention, the following advantages will be achieved. As the first feature of the present invention, it is possible to integrally manage a plurality of routers. First, along with the IP devices (routers) that are installed and configured on a layer 2 network (LAN) by applying IPv6 technology, the automatic configuration of routers will be achieved. That is, the routers autonomously or automatically operate by themselves to read configuration files and start their operations without directly being acted on. Further, the routers are updated through push-type delivery of difference configuration files. The routers are updated at predetermined time intervals by pushing configuration files and firmware from LAN server 203 into routers. Further, a proxy monitoring function is achieved in accordance with the present invention, wherein the state of operation is monitored by relay server as a proxy, and any result of the monitoring will be sent to a specific server.

As the second feature, it is possible to provide a number of routers with their initial configurations through a single user interface given at LAN server. By this feature of the present invention, separate work on every single router by an engineer is no longer necessary in initial configuration, update of configuration, and transfer of configuration to an alternative machine when the router fails.

As the third feature, no access is allowed to routers except from LAN server. The configuration data will not be stored in the routers but will be used on a memory of each router. This is why the configuration data will be protected from such attacks on the routers as theft of a router itself or problems of leakage of data.

Figure 8:
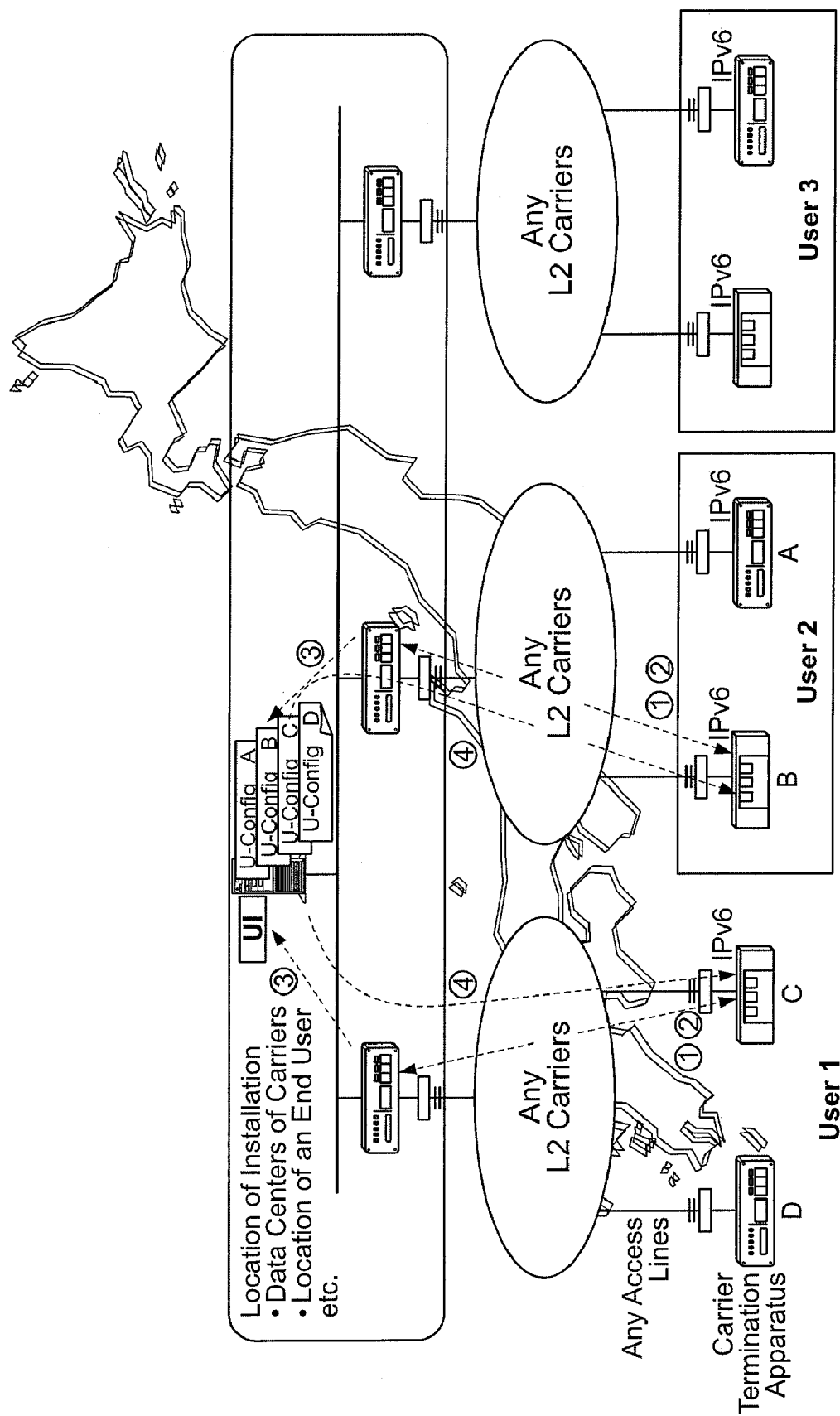
FIG. 8 is a diagram showing how a wide area L2 (WAN) service can be provided by a telecommunication service carrier of the management system in accordance with the present invention.

As the fourth feature, the management system is applicable to a wide area L2 (WAN) service that communication carriers provide, which is outlined in FIG. 8.

In the foregoing description, an embodiment is shown as in FIG. 2, wherein IPv4 and IPv6 co-exist. Thus, relay server 202 in the above description functions to convert addresses between IPv4 and IPv6. However, as defined in appended Claim 1 and Claim 6 that defines a method invention corresponding to the system invention defined by Claim 1, the present invention works irrespectively of whether the relay server has a conversion function between two different protocols. The management system works when protocols available on Ethernet® such as IPX, SNA, or FNA other than IPv4 or IPv6 in the above-discussed embodiment are used. In the above embodiment, the management network in the upper portion of FIG. 2, that is, above relay server 202, is based on IPv4 while the consumer network in the lower portion of FIG. 2, that is, below relay server 202, is based on IPv6. However, as is suggested above, the management network can be based on IPv6 and the consumer network can be based on non-Internet protocols. In any combination of protocols, the management system in accordance with the present invention appropriately works because the relay server functions to convert these different protocols to each other, thereby achieving the original end. The above additional explanation should be apparent to those skilled in communications technology.

The present invention has been described by referring to the embodiment shown in the drawings. The management system of the present invention has been achieved by replacing the initial server of the above-mentioned previous invention with a relay server that is capable of converting different protocols to each other. The core idea that establishes the present invention is that the link local address automatically generated by a device based on IPv6 is used as an identifier.

The present invention has been described in accordance with the embodiments shown in the drawings. Those skilled in the art will readily recognize that there could be variations to the embodiments, and any variations would be within the spirit and scope of the present invention. Accordingly, many modifications may be made by those skilled in the art without departing from the spirit and scope defined by the appended claims.

What is claimed is:

1. A system for integrally controlling a plurality of network means comprising:

a first management means for connecting a first network, the first network using a first protocol, and a second network, the second network using a second protocol that is the same as or is different from the first protocol, and a second management means connected to the first management means on a side of the second network, wherein a plurality of network connection means are connected to the first management means on a side of the first network, wherein:

(a) each of the plurality of network connection means comprises:

storage means for storing identification data of the network connection means;

means for transmitting a data packet to find the first management means;

means for receiving identification data of the first management means, in response to the data packet, from the first management means;

means for converting the received identification data of the first management means to connection data of the first management means; and means for transmitting the identification data of the network connection means stored in the storage means to the first management means using the connection data of the first management means received from the converting means;

(b) the first management means comprises:

means for receiving the identification data of the network connection means from each of the plurality of network connection means;

means for transmitting the received identification data to the second management means;

means for transmitting configuration data of the network connection means, in response to the transmitted identification data, from the second management means to the network connection means; and address conversion means for converting addresses between the first and second protocols when the first and second protocols are different, and for not converting addresses between the first and second protocols when the first and second protocols are the same; and (c) the second management means comprises:
  storage means for storing configuration data of the plurality of network connection means;
  means for receiving, from the first management means, the identification data transmitted from each of the plurality of network connection means; and
  means for obtaining the configuration data of the network connection means identified using the received identification data from the storage means, and transmitting the obtained configuration data to the first management means,
  thereby realizing integral management of the plurality of network connection means.

2. The system in accordance with claim 1, wherein the second protocol is the Internet Protocol including IPv4 and IPv6, and the first protocol is the Internet Protocol including IPv4 and IPv6 or other protocols used in local area networks.

3. The system in accordance with claim 2, wherein:
  the storage means of the second management means stores difference data between new configuration data to update the configuration data of each of the plurality of network connection means and current configuration data of each of the plurality of network connection means, and schedule data to deliver the difference data; and
  the second management means farther comprises means for transmitting the difference data to each of the plurality of network connection means via the first management means in accordance with the schedule data.

4. The system in accordance with claim 2, wherein the first management means further comprises:
  proxy monitoring means for monitoring a state of operation of each of the plurality of network connection means; and
  means for notifying a management server connected to the second network of an anomaly found in any of the plurality of network connection means by the monitoring means.

5. The system in accordance with claim 2, wherein the second management means further comprises a single user interface through which the configuration data of each of the plurality of network connection means stored in the storage means can be inputted.

6. The system in accordance with claim 1, wherein:
  the storage means of the second management means stores difference data between new configuration data to update the configuration data of each of the plurality of network connection means and current configuration data of each of the plurality of network connection means, and schedule data to deliver the difference data; and
  the second management means further comprises means for transmitting the difference data to each of the plurality of network connection means via the first management means in accordance with the schedule data.

7. The system in accordance with claim 6, wherein the first management means further comprises:
  proxy monitoring means for monitoring a state of operation of each of the plurality of network connection means; and
  means for notifying a management server connected to the second network of an anomaly found in any of the plurality of network connection means by the monitoring means.

8. The system in accordance with claim 6, wherein the second management means further comprises a single user interface through which the configuration data of each of the plurality of network connection means stored in the storage means can be inputted.

9. The system in accordance with claim 1, wherein the first management means further comprises:
  proxy monitoring means for monitoring a state of operation of each of the plurality of network connection means; and
  means for notifying a management server connected to the second network of an anomaly found in any of the plurality of network connection means by the monitoring means.

10. The system in accordance with claim 9, wherein the second management means further comprises a single user interface through which the configuration data of each of the plurality of network connection means stored in the storage means can be inputted.

11. The system in accordance with claim 1, wherein the second management means further comprises a single user interface through which the configuration data of each of the plurality of network connection means stored in the storage means can be inputted.

12. A method for controlling a system for integrally controlling a plurality of network means comprising a first management means for connecting a first network, the first network using a first protocol, and a second network, the second network using a second protocol that is the same as or is different from the first protocol, and a second management means connected to the first management means on a side of the second network, wherein a plurality of network connection means are connected to the first management means on a side of the first network, the method comprising:
  (a) transmitting, by at least one of the plurality of network connection means, a data packet to find the first management means;
  (b) receiving, by the network connection means, identification data of the first management means in response to the data packet from the first management means;
  (c) converting, by the network connection means, the received identification data of the first management means to connection data of the first management means;
  (d) transmitting, by the network connection means, identification data of the network connection means stored in storage means of the network connection means to the first management means using the connection data of the first management means received from the converting step;
  (e) receiving, by the first management means, the identification data of the network connection means from the network connection means;
  (f) converting, by the first management means, addresses between the first and second protocols when the first and second protocols are different, and for not converting addresses between the first and second protocols when the first and second protocols are the same;
  (g) transmitting, by the first management means, the received identification data of the network connection means to the second management means;
  (h) receiving, by the second management means and from the first management means, the identification data transmitted from each of the plurality of network connection means;
  (i) obtaining, by the second management means, configuration data of the network connection means identified using the received identification data from the storage means, and transmitting the obtained configuration data to the first management means, and (j) transmitting, by the first management means, the configuration data of the network connection means in response to the transmitted identification data, from the second management means to the network connection means, thereby realizing integral management of the plurality of network connection means.

13. The method in accordance with claim 12, wherein the second protocol is the Internet Protocol including IPv4 and IPv6, and the first protocol is the Internet Protocol including IPv4 and IPv6 or other protocols used in local area networks.

14. The method in accordance with claim 13, further comprising:

storing, in storage means of the second management means, difference data between new configuration data to update the configuration data of each of the plurality of network connection means and current configuration data of each of the plurality of network connection means, and schedule data to deliver the difference data; and transmitting, by the second management means, the difference data to each of the plurality of network connection means via the first management means in accordance with the schedule data.

15. The method in accordance with claim 13, further comprising:

monitoring, by first management means, a state of operation of each of the plurality of network connection means; and notifying a management server connected to the second network of any anomaly found in any of the plurality of network connection means by the monitoring step.

16. The method in accordance with claim 13, wherein the second management means further comprises a single user interface through which the configuration data of each of the plurality of network connection means stored in the storage means can be inputted.

17. The method in accordance with claim 12, further comprising:

storing, in storage means of the second management means, difference data between new configuration data to update the configuration data of each of the plurality of network connection means and current configuration data of each of the plurality of network connection means, and schedule data to deliver the difference data; and transmitting, by the second management means, the difference data to each of the plurality of network connection means via the first management means in accordance with the schedule data.

18. The method in accordance with claim 17, further comprising:

monitoring, by first management means, a state of operation of each of the plurality of network connection means; and notifying a management server connected to the second network of any anomaly found in any of the plurality of network connection means by the monitoring step.

19. The method in accordance with claim 17, wherein the second management means further comprises a single user interface through which the configuration data of each of the plurality of network connection means stored in the storage means can be inputted.

20. The method in accordance with claim 12, further comprising:

monitoring, by first management means, a state of operation of each of the plurality of network connection means; and notifying a management server connected to the second network of any anomaly found in any of the plurality of network connection means by the monitoring step.

21. The method in accordance with claim 20, wherein the second management means further comprises a single user interface through which the configuration data of each of the plurality of network connection means stored in the storage means can be inputted.

22. The method in accordance with claim 12, wherein the second management means flirt her comprises a single user interface through which the configuration data of each of the plurality of network connection means stored in the storage means can be inputted.

23. A computer-readable storage storing computer program that instructs a computer to execute the steps included in claim 12.

* * * * *